(12) United States Patent
Nakatsuka et al.

(10) Patent No.: US 7,529,884 B2
(45) Date of Patent: May 5, 2009

(54) STORAGE SYSTEM CAPABLE OF DISPERSING ACCESS LOAD

(75) Inventors: Daiki Nakatsuka, Yokohama (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 11/108,710

(22) Filed: Apr. 19, 2005

(65) Prior Publication Data
US 2006/0168394 A1 Jul. 27, 2006

(30) Foreign Application Priority Data
Jan. 26, 2005 (JP) ............... 2005-017871

(51) Int. Cl.
*G06F 12/00* (2006.01)
(52) U.S. Cl. .................... 711/112
(58) Field of Classification Search .......... 711/112
See application file for complete search history.

(56) References Cited

U.S. PATENT DOCUMENTS

| | | | |
|---|---|---|---|
| 6,493,825 B1 * | 12/2002 | Blumenau et al. | 713/168 |
| 6,728,848 B2 * | 4/2004 | Tamura et al. | 711/162 |
| 6,792,472 B1 * | 9/2004 | Otterness et al. | 709/239 |
| 6,877,044 B2 * | 4/2005 | Lo et al. | 710/2 |
| 2004/0117438 A1 * | 6/2004 | Considine et al. | 709/203 |

OTHER PUBLICATIONS

Nov. 20, 2003 Nippon Telegraph and Telephone Corporation Hitachi, Ltd. The Concept of a Storage-centric network which is "safe and secure anywhere" jointly developed.

* cited by examiner

*Primary Examiner*—Matt Kim
*Assistant Examiner*—Sheng-Jen Tsai
(74) *Attorney, Agent, or Firm*—Antonelli, Terry, Stout & Kraus, LLP.

(57) ABSTRACT

To automatically disperse access loads even when the number of client PCs using a storage-centric network changes. A storage controller that controls data write and data read in a disk device in which one or more logical units are set, includes: plural ports connected to client computers via a network; and plural microprocessors that control data input/output through the ports, in which one of the microprocessors serves as a representative microprocessor, and the representative microprocessor refers to, when receiving an access request to access the logical unit from one of the client computers, a connection state of each of the microprocessors and assigns the requested access to one of the microprocessors.

3 Claims, 12 Drawing Sheets

TARGET TABLE 109

| TARGET NAME | LUN | INITIATOR NAME | AUTHENTICATION NAME | PASSWORD |
|---|---|---|---|---|
| Target1 | 0 | Initiator1 | Name1 | xxxx |
| Target2 | 0 | Initiator2 | Name2 | xxxx |
|  | 1 | Initiator3 | Name3 | xxxx |
| Target3 | 0 | Initiator4 | Name4 | xxxx |
|  | 1 | Initiator5 | Name5 | xxxx |

*FIG.3*

MP CONDITION TABLE

| CONNECTION NUMBER | IP ADDRESS | TARGET NAME | LUN | INITIATOR NAME | AUTHENTICATION NAME | PASSWORD |
|---|---|---|---|---|---|---|
| 13 | 192.168.1.1 | Target1 | 0 | Initiator1 | Name1 | xxxx |
| | | Target2 | 0 | Initiator2 | Name2 | xxxx |
| | | | 1 | Initiator3 | Name3 | xxxx |

*FIG.5*

TRAFFIC TABLE

GROBAL TARGET TABLE

| TARGET NAME | LUN | INITIATOR NAME | AUTHENTICATION NAME | PASSWORD |
|---|---|---|---|---|
| Target1 | 0 | Initiator1 | Name1 | xxxx |
| Target2 | 0 | Initiator2 | Name2 | xxxx |
|  | 1 | Initiator3 | Name3 | xxxx |
| Target3 | 0 | Initiator4 | Name4 | xxxx |
|  | 1 | Initiator5 | Name5 | xxxx |
| Target4 | 0 | Initiator6 | Name6 | xxxx |
| Target5 | 0 | Initiator7 | Name7 | xxxx |
|  | 1 | Initiator8 | Name8 | xxxx |
|  | 2 | Initiator9 | Name9 | xxxx |

*FIG.10*

GROBAL CONNECTION TABLE

| STRAGE NAME | MP NUMBER | IP ADDRESS | CONNECTION NUMBER |
|---|---|---|---|
| Storage1 | 1 | 192.168.1.1 | 13 |
| | 2 | 192.168.1.2 | 15 |
| Storage2 | 1 | 192.168.1.3 | 18 |
| | 2 | 192.168.1.4 | 16 |

FIG.11

STORAGE SYSTEM CAPABLE OF DISPERSING ACCESS LOAD

CLAIM OF PRIORITY

The present application claims priority from Japanese application JP2005-17871 filed on Jan. 26, 2005, the content of which is hereby incorporated by reference into this application.

BACKGROUND

This invention relates to a storage system having a function of dispersing load that is imposed by access from clients among plural ports.

The recent evolution of IT systems in corporations has given them an unwanted chance of receiving great damage such as data loss or unexpected interruption of business which are caused by computer virus attacks and natural and man-made disasters including typhoons, earthquakes and fires. In order to avoid such damage, each PC user in a corporation has to manage his/her PC properly and thoroughly by taking a backup of data, updating the OS, running a virus check, upgrading software to a newer version, etc. However, being very time-consuming and labor-consuming, PC management is a burden to the users.

Storage-centric networks have been disclosed to address the problem (see, for example, an online news release titled "The concept of a storage-centric network which is 'safe and secure anywhere' jointly developed", retrieved from Hitachi, Ltd.'s homepage on Dec. 8, 2004, <URL http://www.hitachi.com/New/cnews/031120.html>). In a storage-centric network, data stored in local disks of PCs is gathered in a large-capacity storage system connected to the PCs via a network so that the data is backed up and checked for a virus infection in a centralized manner.

Introduction of a storage-centric network enables a system administrator to singularly manage client PCs. As a result, the running cost is greatly reduced. Also, a security patch is applied to every client PC by simply applying the security patch to an OS or an application in a storage system. Worms and viruses are thus prevented from spreading all over the IT system. Furthermore, a storage-centric network makes it possible to prevent leakage of sensitive information through a PC that is stolen or inadvertently left behind by a user who has been carrying the PC around with him/her since such files are not kept in local disks of client PCs.

SUMMARY

Conventionally, the main use of a storage system is to consolidate disks of server equipment. In an IT system of a corporation, the number of PCs is generally far larger than the number of servers. Therefore, in a storage-centric network, more computers than in a conventional system are connected to a storage system. This is a situation that requires even allocation of client PCs which use the storage-centric network to physical ports of the storage system in order to avoid concentration of access load on a specific physical port of the storage system.

None of conventional storage systems has a function of sending the address of a port of the smallest load in response to a discovery request from a client PC. Accordingly, client PCs cannot be allocated evenly to physical ports of a storage system unless an administrator of the system designs the system such that each port is used by the same number of client PCs and manually registers the design information in the storage system as well as the client PCs when the system is run for the first time.

Once the system is designed as such and run, an increase or decrease in number of users causes the number of accessing client PCs to vary from one physical port to another. An increase or decrease in number of users of the storage-centric network occurs when, for example, a worker joins or leaves the corporation.

A client PC is in most cases for office automation. Usually, users boot up client PCs when they come into the office in the morning and shut down the client PCs when they leave the office in the evening. The absence of some of the users who are on personal leave or business trip also causes a fluctuation in number of users.

The day-to-day fluctuation of user number can create a situation in which many client PCs are connected to one port whereas another port has only a few client PCs connected thereto because of a user who is on business trip. This is ineffective use of the storage system ports and network bands. In addition, processing is busy at the port to which many client PCs are connected, thus lowering the disk access performance of the client PCs connected to the port.

Effective use of the storage system ports and network bands can be regained if the system administrator deals with the fluctuation by examining the load of each physical port and changing the settings of the storage system and the client PCs in a manner that evens out the number of client PCs accessing the physical ports. However, it is too much a burden for the system administrator to change the settings manually on a daily basis, and this is not a practical solution. A technique of facilitating the work to accommodate the fluctuation is therefore demanded.

It is therefore an object of this invention to provide a storage controller that controls data write and data read in a disk device in which one or more logical units are set, including: plural ports connected to client computers via a network; and plural microprocessors that control data input/output through the ports, in which one of the microprocessors serves as a representative microprocessor, and the representative microprocessor refers to, when receiving an access request to access the logical unit from one of the client computers, a connection state of each of the microprocessors and assigns the requested access to one of the microprocessors.

According to this invention, the processing load accompanying access to storage is dispersed evenly among plural microprocessors (MPs). Resources of a storage system (MPs' processing ability) and network bands can thus be utilized effectively.

This invention also eliminates the need to even out the number of client PCs accessing physical ports by manually setting the client PCs and the storage system. The management work of the system administrator is thus made less burdening.

Furthermore, this invention prevents the disk access performance of client PCs from lowering by avoiding concentration of access from the client PCs.

BRIEF DESCRIPTION OF THE DRAWINGS

FIG. 3 is an explanatory diagram of a target table according to the first embodiment of this invention.

FIG. 5 is an explanatory diagram of an MP condition tables according to the first embodiment of this invention.

FIG. 10 is an explanatory diagram of a global target table according to the second embodiment of this invention.

FIG. 11 is an explanatory diagram of a global connection table according to the second embodiment of this invention.

DETAILED DESCRIPTION OF THE PREFERRED EMBODIMENTS

Embodiments of this invention will be described with reference to the accompanying drawings.

First, referring to FIGS. 1 to 8, a description is given on a first embodiment of this invention.

Figure 1:
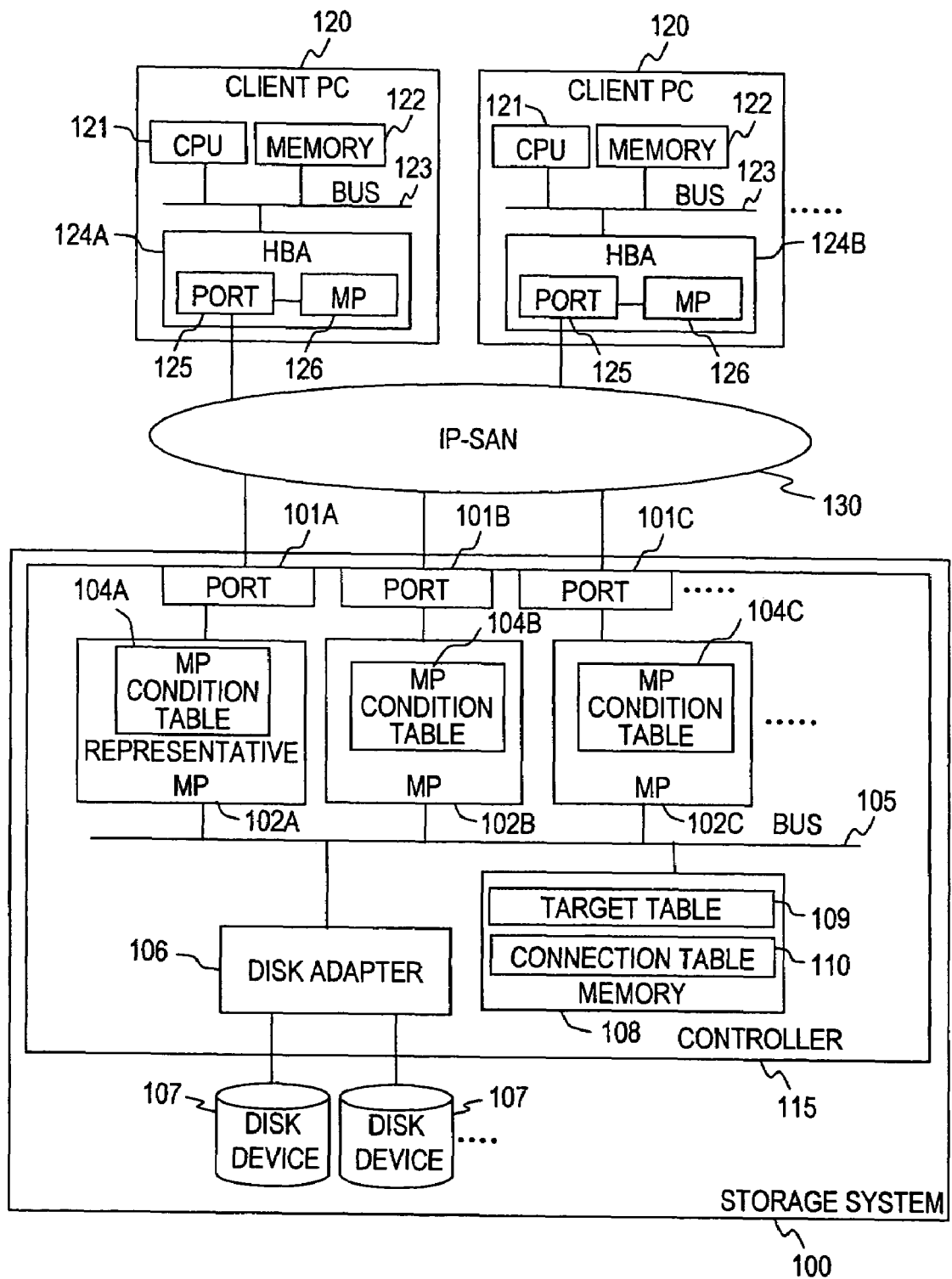
FIG. 1 is a block diagram showing the configuration of a computer system according to a first embodiment of this invention.

FIG. 1 is a block diagram showing the configuration of a computer system according to the first embodiment of this invention.

The computer system of this embodiment is composed of one storage system 100, plural client PCs 120, and an IP-SAN 130, which connects the storage system and the client PCs to each other.

The storage system 100 and the client PCs 120 communicate with each other via the IP-SAN 130. Instead of having their own local disk drives, the client PCs 120 access the shared storage system 100 to execute various applications. The configuration in which disk devices of client PCs are collected in a large-capacity storage system connected to the client PCs via a network is called a storage-centric network.

In FIG. 1, the IP-SAN 130 is a storage area network (SAN) configured with the use of an internet protocol (IP). The IP-SAN 130 of this embodiment employs iSCSI (internet SCSI), which sends an SCSI block encapsulated in an IP packet, but may employ iFCP (internet Fibre Channel Protocol) or FCIP (Fibre Channel over IP).

The client PCs 120 are client computers which use the storage-centric network. The client PCs 120 have CPUs 121, memories 122, host bus adapters (HBAs) 124, and buses 123, which connect these components of the client PCs 120 to one another.

The CPUs 121 execute various application programs stored in the memories 122.

The memories 122 store the application programs executed by the CPUs 121, data used in execution of the application programs, and the like.

The HBAs 124 (124A and 124B) are interfaces connected to the IP-SAN 130 to communicate with the storage system 100 via the IP-SAN 130. The HBAs 124 access the storage system 100 upon request from, for example, one of the applications executed by the CPUs 121, and execute data write/read. The HBAs 124 are composed of ports 125 and microprocessors (MPs) 126.

The ports 125 are physical ports connected to the IP-SAN 130 to communicate with the storage system 100.

The MPs 126 are processors to execute protocol processing in an exchange of packets with the IP-SAN 130 (including iSCSI protocol processing such as encapsulation of a SCSI command), control of a DMA transfer between the ports 125 and the memories 122, and the like.

The client PCs 120 may have, instead of the HBAs 124, network interface cards (NICs) which have only a function of connecting with a normal IP network. In this case, the iSCSI processing is carried out by having the CPUs 121 execute protocol processing programs which are stored in the memories 122.

iSCSI employs a client/server model in which a client is called an initiator and a server is called a target. In this embodiment, the HBAs 124 of the client PCs 120 correspond to the initiator. The target in this embodiment is, as will be described later with reference to FIG. 2, one or more logical units (LUs) inside the storage system 100.

Although FIG. 1 shows two client PCs 120, the computer system of this embodiment may contain more than two client PCs 120.

The storage system 100 is composed of a controller 115 and one or more disk devices 107. The controller 115 is composed of plural ports 101, plural MPs 102, at least one disk adapter 106, and a memory 108.

The ports 101 (101A to 101C) are physical ports which connect the storage system 100 to the IP-SAN 130. The storage system 100 communicates with the client PCs 120 via the ports 101.

The MPs 102 (102A to 102C) are processors connected to the ports 101 to control communications between the ports 101 and the client PCs 120. The MPs 102 execute protocol processing (including iSCSI protocol processing) in an exchange of packets with the IP-SAN 130. The storage system 100 of this embodiment has as many MPs 102 as the ports 101. FIG. 1 shows three ports 101 and three MPs 102, but there may be more than three ports 101 and more than three MPs 102.

The MPs 102 have their respective MP condition tables 104 (104A to 104C). Details of the MP condition tables 104 will be described later with reference to FIG. 5. The MP condition tables 104 may be stored in memories that are incorporated in the respective MPs 102, or may be stored in memories that are connected to the respective MPs 102.

One of the MPs 102 is set as a special MP (representative MP) that can access a table (which will be described later) in the memory 108. In the example of FIG. 1, the MP 102A serves as the representative MP. The representative MP 102A has, in addition to functions of ordinary MPs 102, a function of executing a port assign process of this invention upon receiving a discovery request from the client PCs 120.

The discovery request is a request issued, when the client PCs 120 are to access the storage system 100, to obtain the address of a port to be accessed.

The port assign process is for determining a port to be accessed by the client PCs 120 and sending the address of the port to the client PCs 120 in response to the discovery request. Details of the port assign process will be described later with reference to FIG. 7.

As described, only the representative MP 102A in the controller 115 of this embodiment has the function of executing the port assign process. This invention can be carried out also when each one of the MPs 102 has the function of executing the port assign process so that the port assign process is executed by one of the MPs 102 as needed.

The memory 108 is, for example, a semiconductor memory. The memory 108 stores a target table 109 and a connection table 110. The tables 109 and 110 are referred to during the port assign process. Details of the tables 109 and 110 will be described later with reference to FIGS. 3 and 4.

The disk adapter 106 connects a bus 105 and one or more disk devices 107 to each other to control data write and read in the disk device(s) 107 in accordance with an access request from the client PCs 120.

In the case where plural disk devices 107 are connected to the disk adapter 106, the disk devices 107 may constitute a RAID.

A hard disk serves as the disk device(s) 107 in this embodiment, but a flash memory or other storage media may be employed instead.

The bus 105 connects the MPs 102, the disk adapter 106 and the memory 108 to each other in a communicable manner. The bus 105 may be replaced by a switch (not shown in the drawing).

Figure 2:
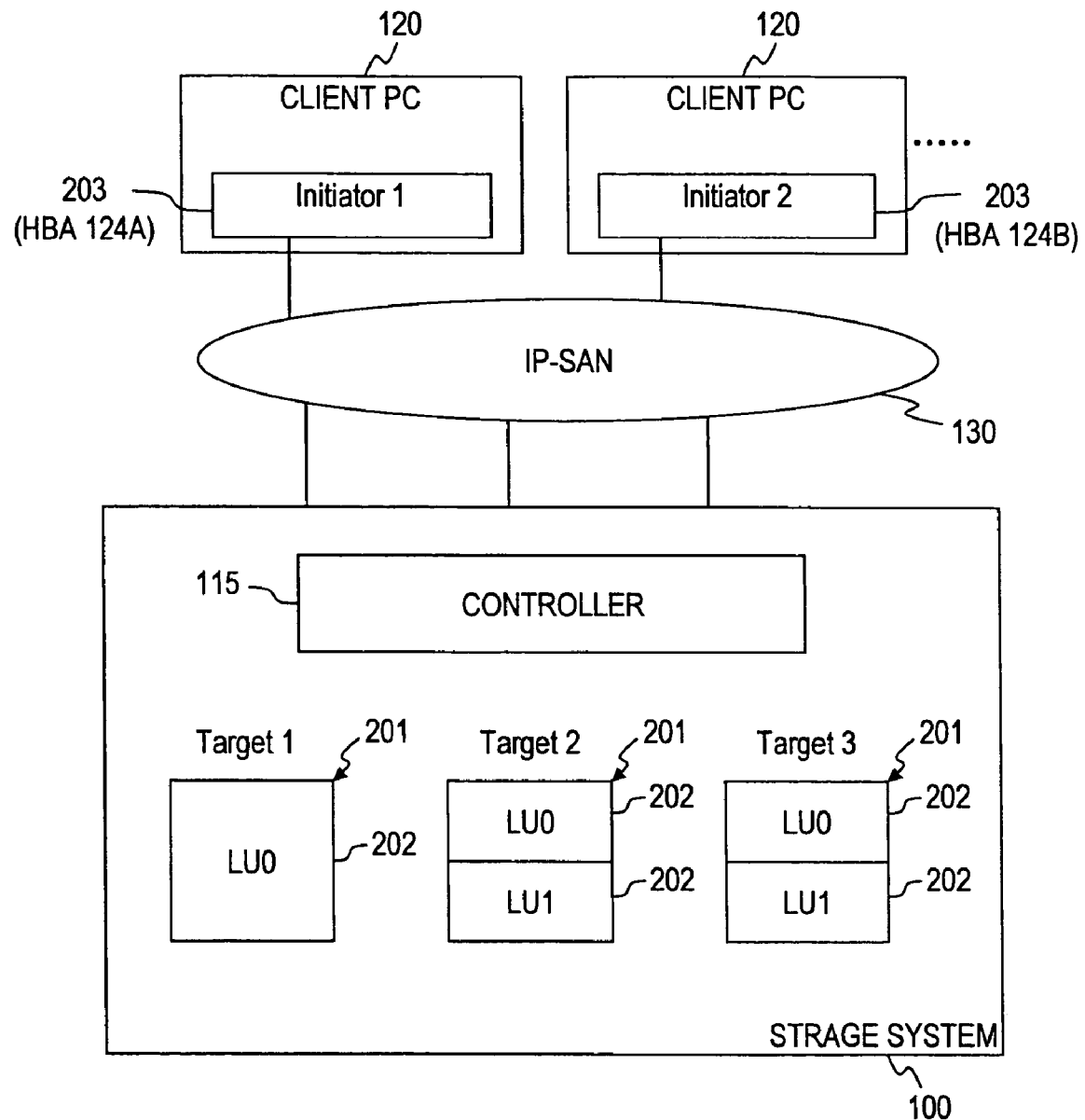
FIG. 2 is a block diagram showing the logical configuration of the computer system according to the first embodiment of this invention.

FIG. 2 is a block diagram showing the logical configuration of the computer system according to the first embodiment of this invention.

As described with reference to FIG. 1, the computer system of this embodiment is composed of the storage system 100 and the client PCs 120 connected to the storage system 100 by the IP-SAN 130. The storage system 100 is composed of the controller 115 and the disk device(s) 107.

The storage area of the disk device(s) 107 has a logical unit (LU) 202 (or LUs 202) set therein. Each LU 202 is an area recognized as a logical disk device by the client PCs 120. In the case where plural disk devices 107 constitute a RAID, one LU 202 may be set over the plural disk devices 107.

One or more LUs 202 constitute one target 201 of iSCSI.

Each LU 202 is identified by an LU number (LUN) that is unique throughout each target 201.

Each target 201 is identified by an ISCSI name (hereinafter referred to as target name) given to the target 201.

In the example of FIG. 2, three targets 201 are set in the storage system 100. Their target names are "Target 1", "Target 2" and "Target 3".

Target 1 is constituted of one LU 202. The LUN assigned to this LU 202 is "0". Hereinafter, any LU 202 whose LUN is "0" will be referred to as "LU0". Similarly, any LU 202 whose LUN is "1" will be referred to as "LU1".

Target 2 is constituted of two LUs 202. These LUs 202 respectively have LUNs of "0" and "1".

Target 3 is, as is Target 2, constituted of two LUs, which are an LU0 and an LU1.

The storage system 100 may have more than three targets 201 set therein. Each target 201 may be constituted of more than two LUs 202.

As described with reference to FIG. 1, the HBAs 124 of the client PCs 120 serve as initiators 203. Each of the initiators 203 is identified by an iSCSI name (initiator name) given to the initiator 203. For instance, the initiator name of the HBA 124A is "Initiator 1" and the initiator name of the HBA 124B is "Initiator 2". The computer system may have more than two initiators 203.

FIG. 3 is an explanatory diagram of the target table 109 according to the first embodiment of this invention.

Figure 7:
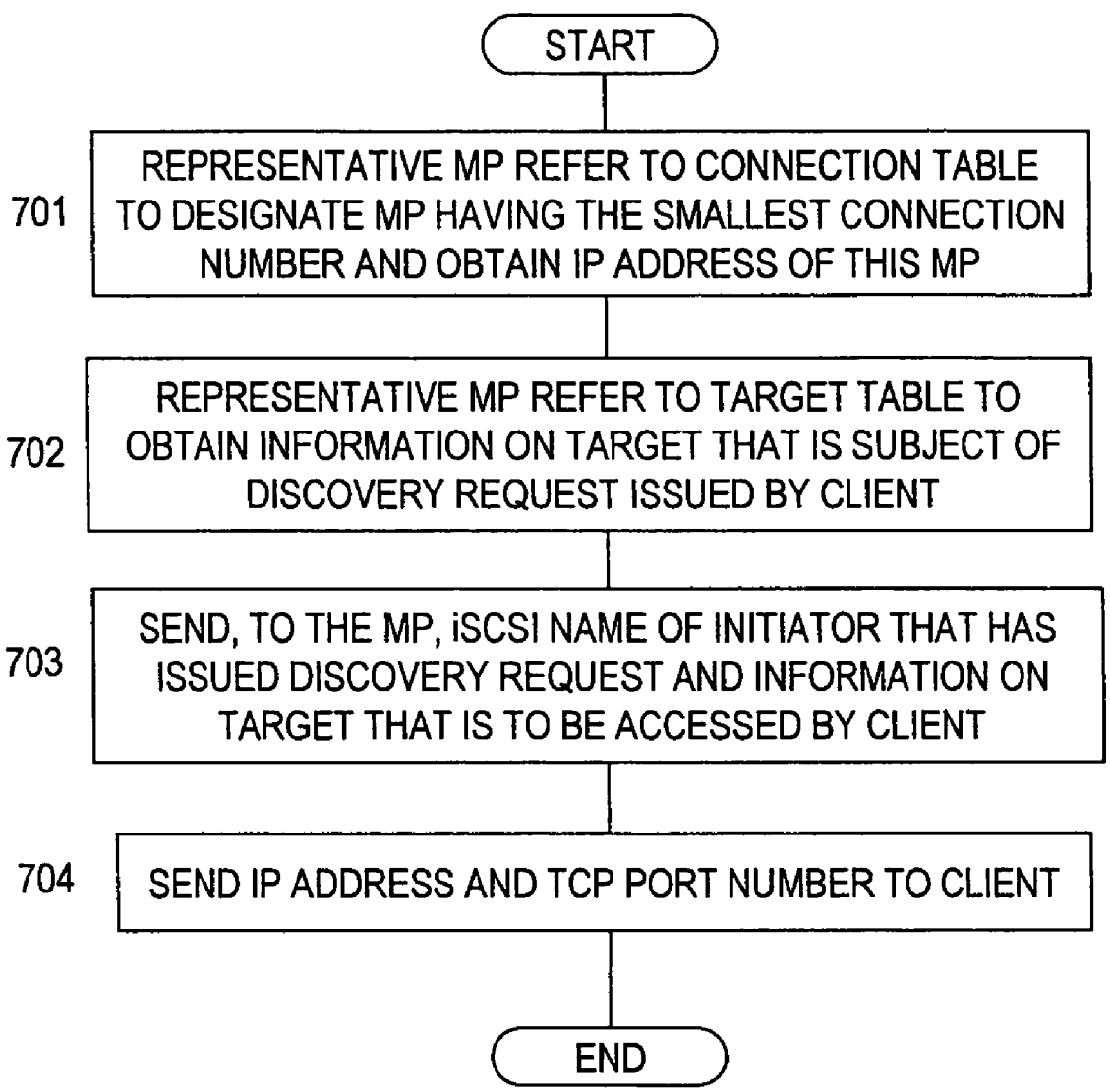
FIG. 7 is a flow chart of a port assign process executed by a representative MP according to the second embodiment of this invention.

The system administrator initially sets the target table 109, and the representative MP 102A refers to the target table 109 in the port assign process shown in FIG. 7.

The target table 109 contains a target name 301, an LUN 302, an initiator name 303, an authentication name 304, and a password 305.

The target name 301 indicates the target name of the target 201 set in the storage system 100. In this embodiment, as shown in FIG. 2, three targets 201, Target 1, Target 2 and Target 3, are set.

The LUN 302 indicates the LUN (Logical Unit Number) of the LU 202 constituting the respective targets 201. The LUN 302 is an identifier of each of the LUs 202. In this embodiment, as shown in FIG. 2, Target 1 is constituted of an LU0, Target 2 is constituted of an LU0 and an LU1, and Target 3 is constituted of an LU0 and an LU1.

The initiator name 303 indicates the iSCSI names of the HBAs 124 (initiators 203) that can access the LUs 202. In this embodiment, five HBAs 124, namely Initiator 1 to Initiator 5 can access the LUs 202. For instance, the HBA 124A serves as Initiator 1 and the HBA 124B serves as Initiator 2. The HBAs 124 that correspond to Initiator 3 to Initiator 5 are omitted from the drawing.

As shown in FIG. 3, Initiator 1 is allowed to access the LU0 of Target 1. Initiator 2 is allowed to access the LU0 of Target 2. Initiator 3 is allowed to access the LU1 of Target 2. Initiator 4 is allowed to access the LU0 of Target 3. Initiator 5 is allowed to access the LU1 of Target 3.

The authentication name 304 and the password 305 provide authentication information of the initiators 203. In order to prevent an unauthorized person from gaining access to the LUs 202 through misuse of the initiator name 303, which can easily be known to a third party, the authentication name 304 and the password 305 which are concealed from a third party are set to each of the initiators 203. The initiators 203 are authenticated by the authentication information when accessing the LUs 202.

The system administrator can set the authentication name 304 and the password 305 at discretion. In the example of FIG. 3, "Name 1" to "Name 5" are set as the authentication name 304 to Initiator 1 to Initiator 5, respectively. Passwords different from one another are set as the password 305 to the initiators 203.

In the case where the initiators 203 do not need to be authenticated, setting the authentication name 304 and the password 305 is optional.

Figure 4:
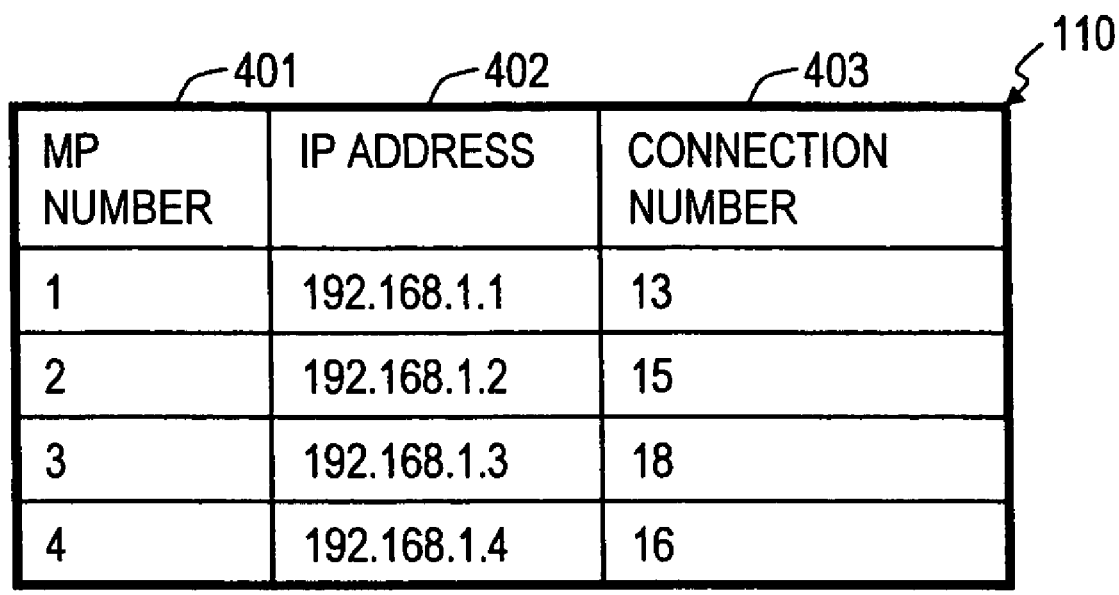
FIG. 4 is an explanatory diagram of a connection table according to the first embodiment of this invention.

FIG. 4 is an explanatory diagram of the connection table 110 according to the first embodiment of this invention.

The connection table 110 is a table that stores the number of connections set to each of the MPs 102 in the storage system 100. The system administrator initially sets the connection table 110. The connection table 110 is updated by the representative MP 102A during a connection number inquiry process shown in FIG. 6, and is referred to by the representative MP 102A during the port assign process shown in FIG. 7.

The number of connections is the number of TCP connections that are currently being processed between the MPs 102 and the client PCs 120.

In FIG. 4, an MP number 401 indicates numbers given to the respective MPs 102 in the storage system 100 to uniquely identify the MPs 102. For instance, "1" is given as the MP number 401 to the representative MP 102A, "2" is given as the MP number 401 to the MP 102B, and "3" is given as the MP number 401 to the MP 102C. The MP whose MP number is "4" is omitted from the drawing.

An IP address 402 indicates IP addresses at which the client PCs 120 access the MPs 102 (in other words, IP addresses set to the ports 101 which are controlled by the MPs).

A connection number 403 indicates the number of TCP connections that are currently being processed by the respective MPs 102. In some cases, one of the MPs 102 processes TCP connections with plural client PCs 120, and this MP 102 may process plural TCP connections with each of the client PCs 120.

In the example of FIG. 4, 13 is the connection number 403 of one of the MPs 102 that has "1" as the MP number 401 (this MP is referred to as MP1). Similarly, 15, 18 and 16 are registered as the connection number 403 for MP2, MP3 and MP4, respectively.

Of the items of the connection table 110, the MP number 401 and the IP address 402 are initially set by the system administrator. The connection number 403, on the other hand, is updated through the connection number inquiry process shown in FIG. 6.

FIG. 5 is an explanatory diagram of the MP condition tables 104 according to the first embodiment of this invention.

Each of the MP condition tables 104 stores information on the initiators 203 and targets 201 assigned to one of the ports 101 that is controlled by one of the MPs 102 that has this table, and stores the number of connections processed by this MP 102. The MP condition tables 104 are referred to by the representative MP 102A during the connection number inquiry process shown in FIG. 6.

FIG. 5 shows as an example the contents of the MP condition table 104A in the MP 102A (representative MP). The MP condition tables 104 of other MPs 102 hold information concerning the respective MPs 102 (other tables 104 than the table 104A will not be illustrated in a drawing).

A connection number 501 in FIG. 5 indicates the number of TCP connections that are currently being processed by the MP 102A. In the example of FIG. 5, the MP 102A is processing thirteen TCP connections at present. When there is a change in number of TCP connections being processed, the MP 102A updates the numerical value of the connection number 501.

An IP address 502 indicates an IP address which enables the client PCs 120 to access the MP 102A. In the example of FIG. 5, an IP address "192.168.1.1" is set as the IP address of the MP 102A.

A target name 503 indicates the target names of the targets 201 to which the LUs 202 allocated to the MP 102A belong. An LUN 504 indicates the LUNs of the LUs 202 allocated to the MP 102A.

An initiator name 505 indicates the names (iSCSI names) of the initiators 203 that are allowed to access the LUs 202 that are identified by the target name 503 and the LUN 504.

An authentication name 506 and a password 507 provide authentication information of the initiators 203. When receiving an access request from the initiators 203, the MPs 102 uses the authentication information to authenticate the initiators 203 and check the validity of the access.

For instance, when receiving a log-in request from Initiator 1, the MP 102A compares an authentication name and a password which are contained in the log-in request against "Name 1" stored as the authentication name 506 in its MP condition table 104A and a password 507 associated with "Name 1" in the table. In the case where the two sets of authentication name and password match, the MP 102A judges that the log-in request is valid and allows Initiator 1 to log in. On the other hand, in the case where the two sets of authentication name and password do not match, the MP 102A judges that the log-in request is invalid (that the log-in request is issued from other initiators 203 than Initiator 1) and inhibits this initiator from logging in.

The target name 503, the LUN 504, the initiator name 505, the authentication name 506 and the password 507 are registered in the MP condition table 104A of the MP 102A which controls the port 101A by copying, when access from the initiators 203 to the LUs 202 is assigned to the port 101A through the port assign process, entries of the target table 109 that correspond to the access to the MP condition table 104A.

In the example of FIG. 5, access from Initiator 1 to the LU0 of Target 1, access from Initiator 2 to the LU0 of Target 2, and access from Initiator 3 to the LU1 of Target 2 are assigned to the port 101A. Accordingly, information in the first to third rows of the target table 109 that correspond to the assigned access is copied to the MP condition table 104A to fill in the fields of the items 503 (target name) to 507 (password).

Next, a description will be given on processing executed by the system administrator before running the computer system of this embodiment.

Before the computer system is run, the system administrator sets an IP address to each of the ports 101 and 125. DHCP (Dynamic Host Configuration Protocol) may be employed at this point. The IP addresses set to the ports 101 of the storage system 100 are stored as the IP address 502 in the respective MP condition tables 104 of the MPs 102 which manage their respective ports 101.

The system administrator then creates LUs 202 of arbitrary capacity. The iSCSI names of targets to which the created LUs 202 belong and the LUNs of the created LUs 202 are registered in the target table 109 as the target name 301 and the LUN 302, respectively. The system administrator also registers, as the initiator name 303, the iSCSI names of the initiators 203 that can access the created LUs 202 in the target table 109. In the case where the initiators 203 needs to be authenticated, the system administrator further sets an arbitrary authentication name and an arbitrary password as the authentication name 304 and the password 305 to each of the initiators 203.

Figure 6:
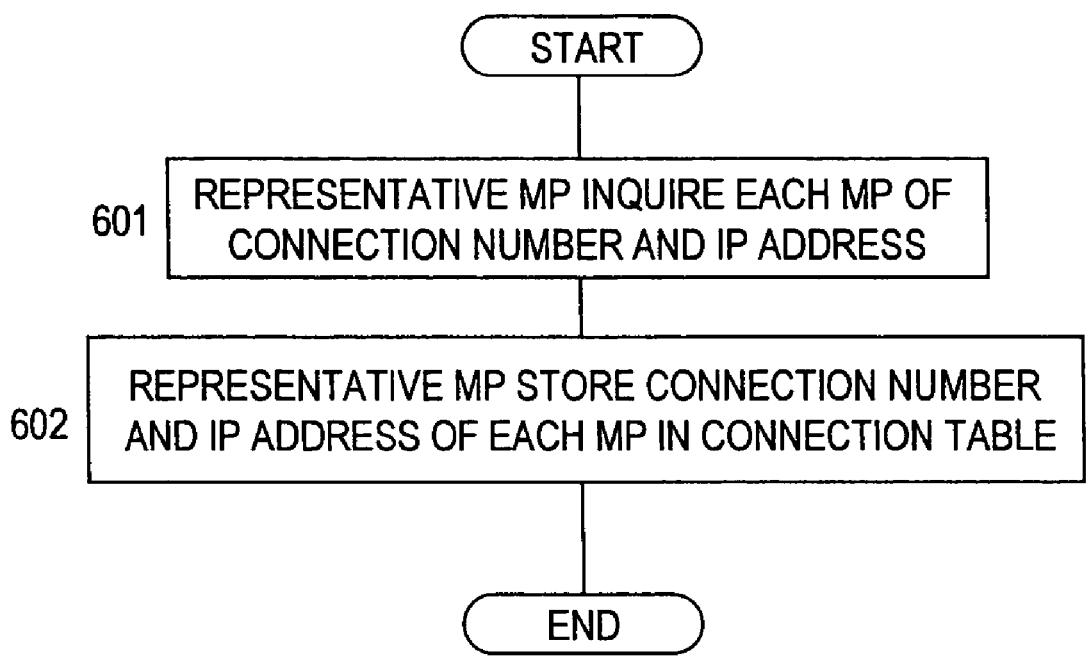
FIG. 6 is a flow chart of a connection number inquiry process executed by a representative MP according to the first embodiment of this invention.

Described next with reference to FIGS. 6 and 7 is processing executed by the representative MP 102A according to this embodiment.

FIG. 6 is a flow chart of the connection number inquiry process executed by the representative MP 102A according to the first embodiment of this invention.

The connection number inquiry process is processing to update the connection table 110 to the latest data.

As the connection number inquiry process is started, the representative MP 102A inquires the other MPs 102 of their respective current connection numbers and IP addresses (a step 601). Specifically, the representative MP 102A issues, via the bus 105, a request to obtain the current connection number and the IP address, and the MPs 102 respectively refers to the MP condition tables 104 to send the connection number 501 and the IP address 502 to the representative MP 102A in response to the request. The representative MP 102A thus obtains the connection number 501 and the IP address 502 for each of the other MPs 102. The representative MP 102A obtains its own connection number 501 and IP address 502 by referring to the MP condition table 104A.

Then the representative MP 102A stores the connection number 501 and the IP address 502 that are obtained in the step 601 for each of the MPs 102 in the connection table 110 as the connection number 403 and the IP address 402 (a step 602).

The connection number inquiry process may be executed regularly (for example, at ten-minute intervals), or may be executed prior to execution of the port assign process.

FIG. 7 is a flow chart of the port assign process executed by the representative MP 102A according to the first embodiment of this invention.

The port assign process is a process to assign, when one of the client PCs 120 sends a discovery request to the representative MP 102A, access to an LU 202 that is the subject of the request to one of ports 101 such that the access load is dispersed.

As the port assign process is started upon reception of the discovery request, the representative MP 102A refers to the connection table 110 to designate one of the MPs 102 that is smaller in connection number 403 than any other MPs 102. The representative MP 102A then obtains the IP address 402 at which the designated MP 102 is accessed (a step 701).

The representative MP 102A then refers to the target table 109 to obtain information on the target 201 and the LU 202 that are the subject of the discovery request issued from one of the client PCs 120 (a step 702). Specifically, the representative MP 102A refers to the target table 109 to retrieve, from entries corresponding to the target 201 and the LU 202 that are the subject of the discovery request, the initiator name 303 (the initiator names 303 of the initiators 203 that can access the subject LU 202), the authentication name 304, and the password 305.

The representative MP 102A next sends, to the MP designated in the step 701, the iSCSI name of the one of the initiators 203 that has issued the discovery request (namely, the HBA 124 of the one of the client PCs 120 that has issued the discovery request) and information on the target 201 and the LU 202 to be accessed by this client PC 120 (a step 703). Specifically, the representative MP 102A sends the target name 301 of the target 201 that is the subject of the discovery request, the LUN 302 of the LU 202 that is the subject of the discovery request, and the information obtained in the step 702.

Receiving the data, the designated MP stores the data in its MP condition table 104.

The representative MP 102A then sends, to the one of the client PCs 120 that has issued the discovery request, an IP address and a TCP port number that are used to access the MP 102 whose connection number 403 has been determined in the step 701 as smaller than any other (a step 704).

The port assign process is completed through the above steps.

Receiving the data in the step S704, the one of the client PCs 120 that has issued the discovery request logs in at the IP address contained in the data, and recognizes as a device the LU 202 that is the subject of the discovery request. This client PC 120 can thus access the subject LU 202.

Now, a specific description of the port assign process is given taking as an example the case in which one of the client PCs 120 issues a discovery request with the LU1 of Target 2 as the subject. In the description, the third row of the MP condition table 104A shown in FIG. 5 is blank at the start of the port assign process.

The representative MP 102A refers to the connection table 110 to designate the MP1 whose connection number 403 is the smallest at "13". The representative MP 102A then obtains an IP address "192.168.1.1" at which the MP1 is accessed (the step 701).

Next, the representative MP 102A refers to the target table 109 to obtain "Initiator 3" as the initiator name 303 that is registered for the LU1 of Target 2 which is the subject of the discovery request, "Name 3" as the authentication name 304 that is associated with Initiator 3, and the password 305 that is associated with Name 3 (the step S702).

The representative MP 102A sends, to the MP1, "Target 1" as the target name 301, "1" as the LUN 302, "Initiator 3" as the initiator name 303, "Name 3" as the authentication name 304, and the password 305 that is associated with Name 3 (the step 703).

The information is actually not sent to the MP1 but is stored in the third row of the MP condition table 104A as shown in FIG. 5 since in this example MP1 serves as the representative MP 102A.

The representative MP 102A then sends, to one of the client PCs 120 that has issued the discovery request, an IP address "192.168.1.1" and a TCP port number that are used to access the MP1 (the step 704).

Receiving the data, the one of the client PCs 120 that has issued the discovery request logs in at the IP address "192.168.1.1" and recognizes the LU1 of Target 2 as a device. This client PC can thus access the LU1 of Target 2.

The memory 108 in the above-described first embodiment of this invention stores the connection table 110, which holds the number of connections. Instead of the connection table 110, the memory 108 may store a traffic table to hold the amount of traffic.

Figure 8:
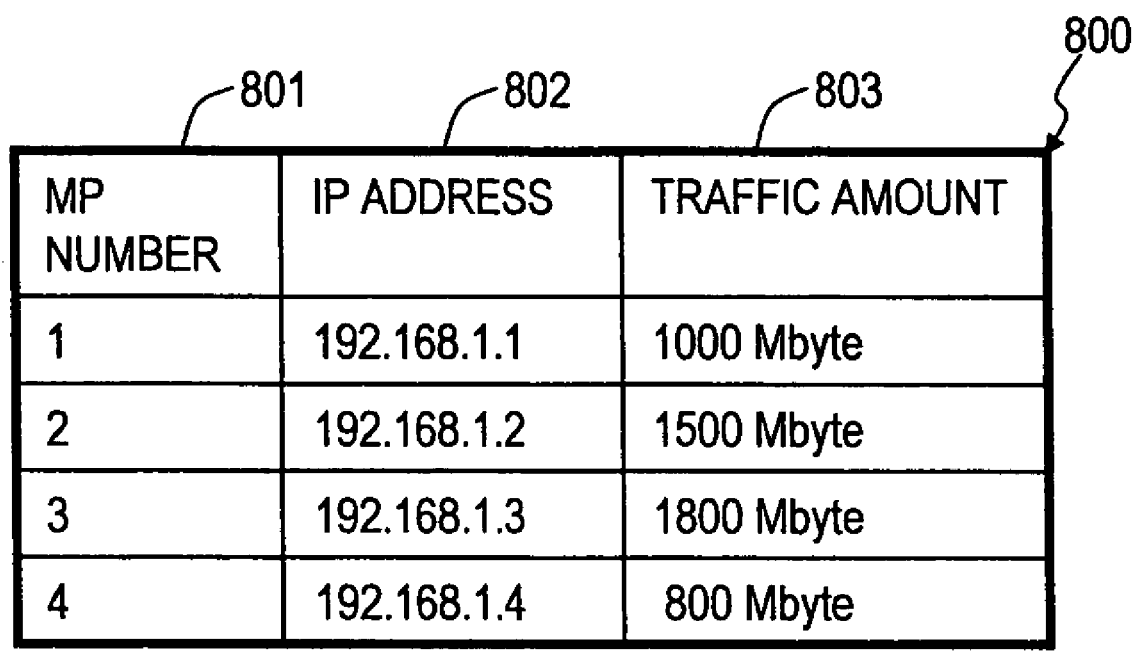
FIG. 8 is an explanatory diagram of a traffic table according to the first embodiment of this invention.

FIG. 8 is an explanatory diagram of a traffic table according to the first embodiment of this invention.

A traffic table 800 is a table that stores the amount of traffic at each of the ports 101 controlled by the MPs 102 in the storage system 100. The system administrator initially sets the traffic table 800. The traffic table 800 is updated by the representative MP 102A during the connection number inquiry process shown in FIG. 6, and is referred to by the representative MP 102A during the port assign process shown in FIG. 7.

The amount of traffic is, for example, the amount of data transferred per unit time through the respective ports 101.

An MP number 801 and an IP address 802 in FIG. 8 are the same as the MP number 401 and the IP address 402 in FIG. 4, and descriptions thereof are therefore omitted here.

A traffic amount 803 indicates the amount of traffic at each of the ports 101 controlled by the MPs 102. The traffic amount 803 in the example of FIG. 8 is measured in megabytes by the amount of data transferred per unit time. In FIG. 8, 1000 (MB: megabytes), 1500 (MB), 1800 (MB) and 800 (MB) are listed as the traffic amount 803 for the MP1, the MP2, the MP3 and the MP4, respectively.

When the memory 108 stores the traffic table 800 instead of the connection table 110, the representative MP 102A inquires, in the step 601 of the connection number inquiry process of FIG. 6, the MPs 102 of their respective current traffic amounts and IP addresses.

The representative MP 102A stores the traffic amount and the IP address 502 that are obtained in the step 602 for each of the MPs 102 in the traffic table 803 as the traffic amount 803 and the IP address 802.

In the step 701 of the port assign process of FIG. 7, the representative MP 102A refers to the traffic table 800 to designate one of the MPs 102 whose traffic amount 803 is the smallest and to obtain the IP address 802 at which the designated MP is accessed.

Alternatively, the memory 108 of this embodiment may store a table that holds the number of connections and the amount of traffic for each MP (a drawing of the table is omitted). In this case, the connection number and the traffic amount are referred to in the port assign process.

According to the above first embodiment of this invention, when a client PC sends a discovery request to a storage system, a representative MP of the storage system assigns access from the client PC to an MP whose connection number or traffic amount is small.

Thus the access load is substantially evenly dispersed among MPs, so that the MPs' processing performance and network bands are effectively utilized.

The load dispersion processing is automatically executed by the representative MP, and the work load of the system administrator is reduced accordingly.

Furthermore, with access from client PCs substantially evenly dispersed among MPs, the disk access performance of the client PCs is prevented from lowering.

Described next with reference to FIGS. 9 to 13 is a second embodiment of this invention. In the second embodiment of this invention, configurations that are common to those in the first embodiment of this invention will not be described in detail.

Figure 9:
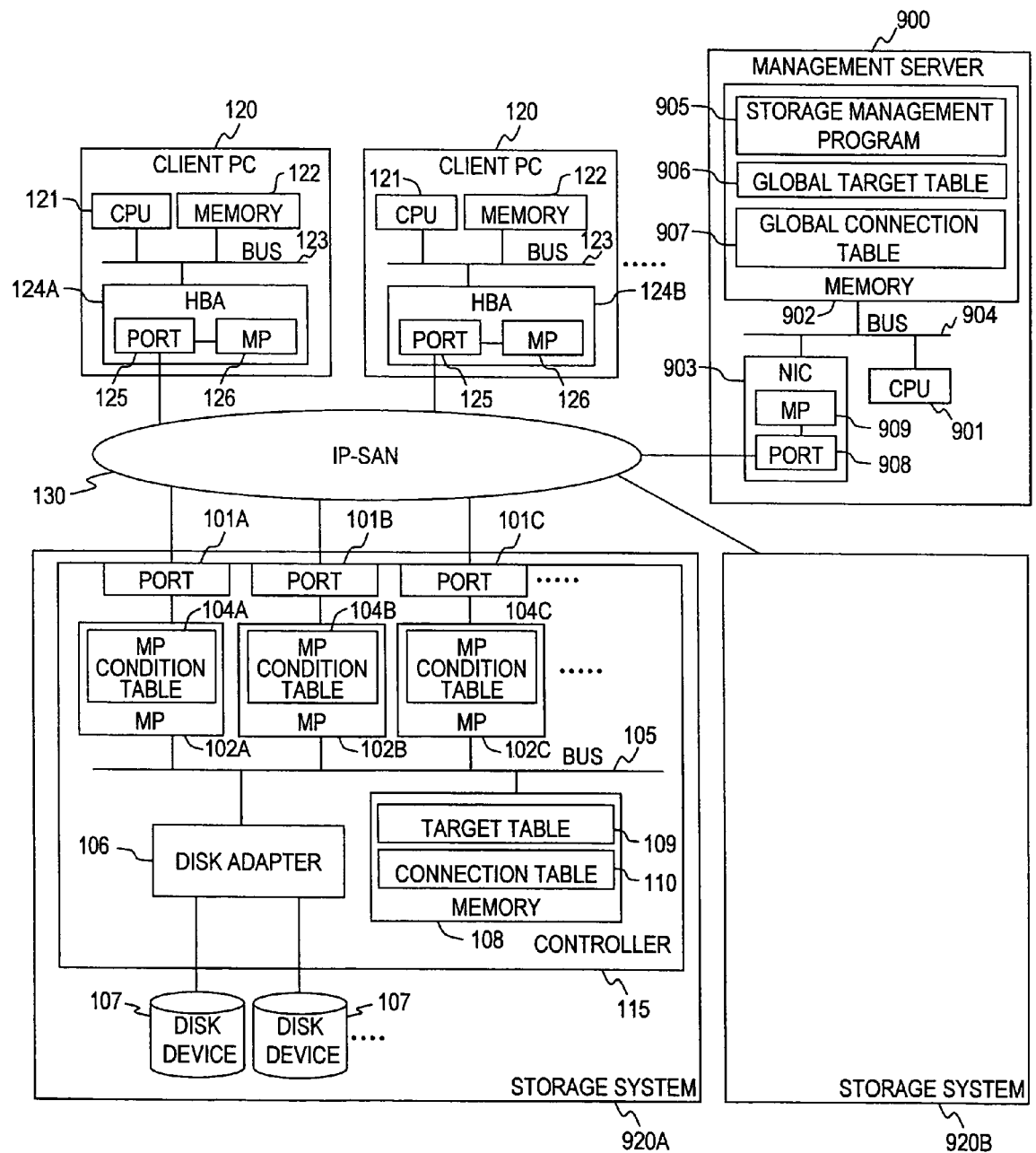
FIG. 9 is a block diagram showing the configuration of a computer system according to a second embodiment of this invention.

FIG. 9 is a block diagram showing the configuration of a computer system according to the second embodiment of this invention.

The computer system of FIG. 9 according to the second embodiment differs from the computer system of FIG. 1 according to the first embodiment in that a management server 900 is connected to an IP-SAN 130 and that one or more storage systems 920 can be connected to the IP-SAN. Except for these points, the computer system of the second embodiment has the same configuration as that of the computer system of the first embodiment.

FIG. 9 shows, as an example, two storage systems 920 (920A and 920B).

The configuration of the storage system 920A is the same as that of the storage system 100 of the first embodiment except that the storage system 920A has plural normal MPs 102 but no representative MP.

The configuration of the storage system 920B is similar to that of the storage system 920A. Therefore, the storage system 920B is not illustrated in a drawing. The only difference between the two is that Target 4 and Target 5 each constituted of one or more LUs 202 are set to the storage system 920B as shown in FIG. 10.

The management server 900 is a computer to manage the storage systems 920 connected to the IP-SAN 130. An iSNS (internet Storage Name Service) server, for example, serves as the management server 900.

The management server 900 is composed of a CPU 901, a memory 902, a network interface card (NIC) 903, and a bus 904, which connects the components of the management server 900 to one another.

The CPU 901 executes a program stored in the memory 902.

The memory 902 stores the program executed by the CPU 901, data used in execution of the program, and the like. In this embodiment, the memory 902 stores at least a storage management program 905, a global target table 906, and a global connection table 907. The storage management program 905 executes, at least, a port assign process shown in FIG. 12. The program and tables will be described later in detail.

The NIC 903 is an interface having a function of connecting with an IP network. The NIC 903 is composed of a port 908 and an MP 909.

The port 908 is a physical port connected to the IP-SAN 130 to communicate with the client PCs 120 and the storage systems 920.

The MP 909 is a processor to execute, among others, protocol processing in an exchange of packets with the IP-SAN 130.

The global target table 906 and global connection table 907 of the management server 900 are described next. The tables store information obtained from a target table 109 and connection table 110 of each of the storage systems 920.

An administrator of the system initially sets the target table 109 and connection table 110 of each of the storage systems 920. The storage systems 920 respectively sends data set of the target table 109 and the connection table 110 to the management server 900 following, for example, the iSNS protocol. The management server 900 stores the received data in the global target table 906 and the global connection table 907.

FIG. 10 is an explanatory diagram of the global target table 906 according to the second embodiment of this invention.

The global target table 906 stores information obtained from the target table 109 of each of the storage systems 920. The target name 301, the LUN 302, the initiator name 303, the authentication name 304 and the password 305 in FIG. 10 are the same as the target table 109 shown in FIG. 3, and descriptions thereof are therefore omitted.

In the example of FIG. 10, information on Target 1 to Target 3 is information obtained from the storage system 920A. This means that LUs 202 belonging to Target 1 to Target 3 are in the storage system 920A. Information on Target 4 and Target 5 is information obtained from the storage system 920B. In other words, LUs 202 belonging to Target 4 and Target 5 are in the storage system 920B.

FIG. 11 is an explanatory diagram of the global connection table 907 according to the second embodiment of this invention.

The global connection table 907 stores information obtained from the connection table 110 of each of the storage systems 920. An MP number 1102, an IP address 1103 and a connection number 1104 in FIG. 11 are the same as the MP number 401, the IP address 402 and the connection number 403 in the connection table 110, respectively, and descriptions thereof are therefore omitted.

A storage name 1101 indicates names to identify the storage systems 920 from which information such as the MP number 1102 is obtained. For instance, the storage system 920A has "Storage 1" as the storage name 1101 and the storage system 920B has "Storage 2" as the storage name 1101. In this case, information in the first and second rows of FIG. 11 is obtained from the connection table 110 of the storage system 920A whereas information in the third and fourth rows is obtained from the connection table 110 of the storage system 920B.

Figure 12:
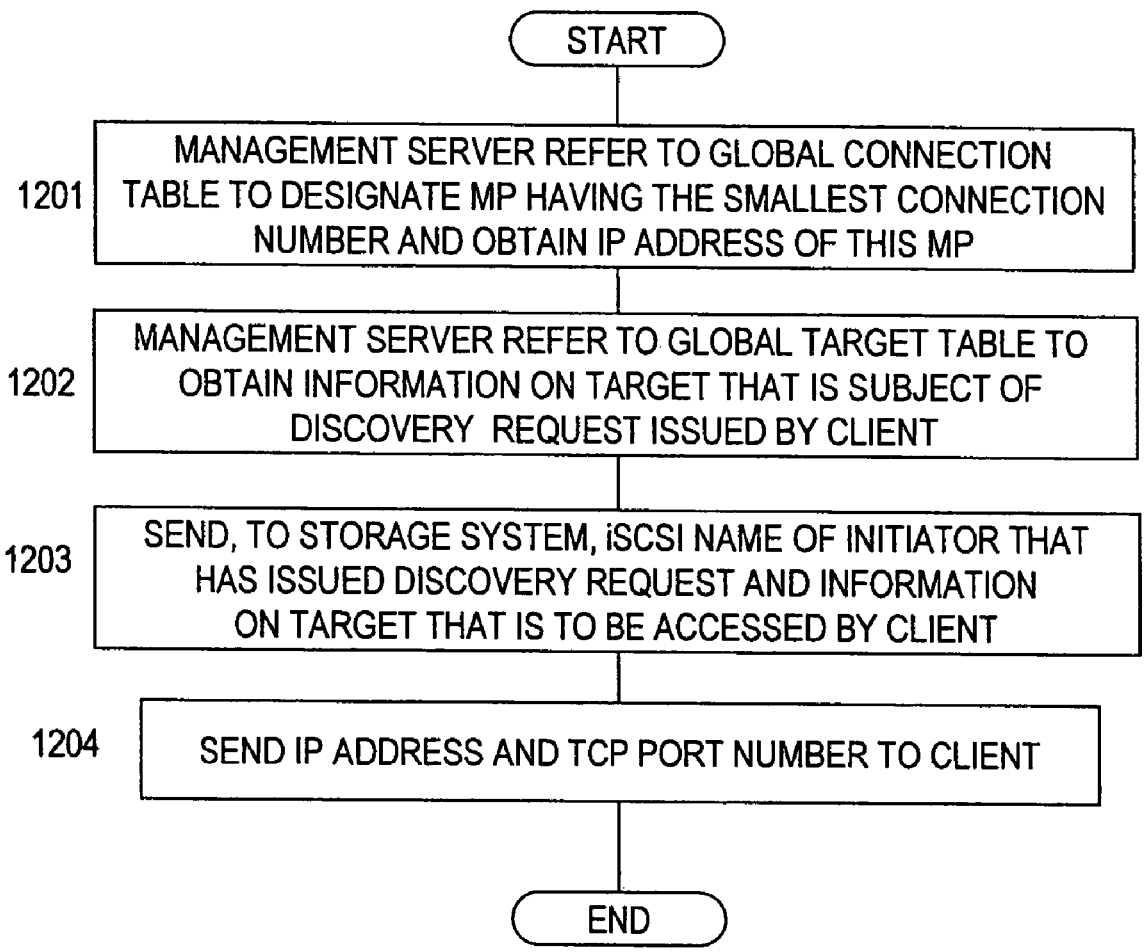
FIG. 12 is a flow chart of a port assign process executed by a storage management program according to the second embodiment of this invention.

The description given next with reference to FIG. 12 is about the port assign process executed by the storage management program 905 of the management server 900 according to this embodiment.

In this embodiment too, one of the MPs 102 in each of the storage systems 920 executes the connection number inquiry process shown in FIG. 6 to update the connection table 110. The storage systems 920 each send data in the updated connection table 110 to the management server 900. The management server 900 refers to the received data to update the global connection table 907. The connection table 110 and the global connection table 907 may be updated regularly (for example, at ten-minute intervals), or may be updated immediately before the connection number inquiry process shown in FIG. 12.

FIG. 12 is a flow chart of the port assign process executed by the storage management program 905 according to the second embodiment of this invention.

The port assign process of this embodiment is a process to assign, when one of the client PCs 120 sends a discovery request to the management server 900, access to an LU 202 that is the subject of the request to one of ports 101 such that the access load is dispersed.

As the port assign process is started upon reception of the discovery request, the storage management program 905 refers to the global connection table 907 to designate one of the MPs 102 that is smaller in connection number 1104 than any other MPs 102 in one of the storage systems 920 that contains the LU 202 that is the subject of the discovery request. The storage management program 905 then obtains the IP address 1103 at which the designated MP is accessed (a step 1201).

For instance, in FIG. 11, when a storage system having "Storage 1" as the storage name 1101 contains the LU 202 that is the subject of the discovery request, an MP1 and an MP2 that are associated with "Storage 1" are compared with each other in terms of the connection number 1104. As a result, the MP1 which is smaller in connection number 1104 than MP2 is designated and the IP address of the MP1, "192.168.1.1", is obtained.

The storage management program 905 then refers to the global target table 906 to obtain information on a target 201 and the LU 202 that are the subject of the discovery request issued from the one of the client PCs 120 (a step 1202). Specifically, the storage management program 905 refers to the global target table 906 to retrieve, from entries corresponding to a target 201 and the LU 202 that are the subject of the discovery request issued from the one of the client PCs 120, the initiator name 303 (the initiator names 303 of the initiators 203 that can access the subject LU 202), the authentication name 304, and the password 305.

The storage management program 905 next sends, to the MP 102 designated in the step 1201, the iSCSI name of the one of the initiators 203 that has issued the discovery request (namely, the HBA 124 of the one of the client PCs 120 that has issued the discovery request) and information on the target 201 and the LU 202 to be accessed by this client PC 120 (a step S1203). The data sent to the designated MP contains the target name 301 of the target 201 that is the subject of the discovery request, the LUN 302 of the LU 202 that is the subject of the discovery request, and the information obtained in the step 1202. The data is sent from the management server 900 via the IP-SAN 130 to one of the storage systems 920 to which the designated MP 102 belongs.

Receiving the data, the designated MP 102 stores the data in its MP condition table 104.

The storage management program 905 then sends, to the one of the client PCs 120 that has issued the discovery request, an IP address and a TCP port number that are used to access the MP 102 whose connection number 1104 has been determined in the step 1201 as smaller than any other (a step 1204).

The port assign process of this embodiment is completed through the above steps.

Receiving the data in the step 1204, the one of the client PCs 120 that has issued the discovery request logs in at the IP address contained in the data, and recognizes as a device the LU 202 that is the subject of the discovery request. This client PC 120 can thus access the subject LU 202.

The memory 108 in the above-described second embodiment of this invention stores the connection table 110 but, as in the first embodiment, may instead store the traffic table shown in FIG. 8. In this case, the memory 902 of the management server 900 holds a global traffic table (not illustrated in a drawing) which stores the amount of traffic obtained from each of the storage systems 920. In the step 1201 of FIG. 12, one of the MPs 102 whose traffic amount is the smallest is designated and the IP address of the designated MP is obtained.

The computer system according to the second embodiment of this invention has the management server 900, which is independent. Alternatively, one of the storage systems 920 may have functions that equal the functions of the management server 900 to execute the connection number inquiry process and port assign process described above.

According to the above second embodiment of this invention, a client PC sends a discovery request to a management server and, receiving the request, the management server assigns access from the client PC to an MP whose connection number or traffic amount is smaller than any other MPs in a storage system.

Thus the access load is substantially evenly dispersed among MPs, so that the MPs' processing performance and network bands are effectively utilized.

The load dispersion processing is automatically executed by the management server, and the work load of the system administrator is reduced accordingly.

The management server can communicate with plural storage systems via an IP-SAN. This invention is therefore applicable to a computer system that contains plural storage systems and can disperse the access load in the computer system.

Furthermore, with access from client PCs substantially evenly dispersed among MPs, the disk access performance of the client PCs is prevented from lowering.

What is claimed is:

1. A computer system comprising:
   one or more disk devices that store data;
   a storage controller that controls data write and data read in the disk devices;
   plural client computers connected to the storage controller via an IP-SAN,
   wherein the client computers have host bus adapters connected to the IP-SAN,
   wherein a target constituted of one or more logical units is set in a storage area of the disk devices,
   wherein the storage controller has:
      plural ports connected to the IP-SAN;
      plural microprocessors that control the ports;
      a memory;
      a disk adapter connected to the disk devices; and
      a bus that connects the microprocessors, the memory, and the disk adapter to one another,
   wherein each of the microprocessors holds an MP information table that stores the number count of TCP connections that are being processed by the microprocessor,
   wherein the memory holds:
      a target table that stores a name of the target set to the storage area, identifiers of the logical units constituting the target, names of the host bus adapters that are allowed to access the logical units, authentication information of the host bus adapters, and password; and
      a connection table that stores IP addresses at which the microprocessors are accessed and the TCP connection number count obtained from each of the microprocessors, and
   wherein one of the microprocessors serves as a representative microprocessor which:
      inquires each of the microprocessors of the TCP connection number count;
      stores, in the connection table, the TCP connection number count sent from each of the microprocessors;

refers to, upon reception of a discovery request from one of the client computers, the connection table, and obtains an IP address of one of the microprocessors whose TCP connection number count is the smallest;

refers to the target table, and obtains a name of one of the host bus adapters that is associated with the identifier of the logical unit that is a subject of the discovery request and with a name of the target to which this logical unit belongs, and authentication name of this host bus adapter;

obtains the IP address of the MP having the smallest TCP connection number according to the discovery request for obtaining the address of a port to be accessed;

sends, to the microprocessor whose TCP connection number count is the smallest, the target name and the logical unit identifier that are the subject of the discovery request, and the obtained host bus adapter name, host bus adapter authentication information, and password; and sends the obtained IP address to access the MP having the smallest TCP connection number to the client computer that has issued the discovery request;

wherein the MP having the smallest TCP connection number stores the received target name and the logical unit identifier that are the subject of the discovery request, and the obtained host bus adapter name, host bus adapter authentication information, and password into its own MP information table;

wherein the MP having the smallest TCP connection number compares, in a case where a log-in request from one of the plurality of host bus adapters is received, a password and an authentication name contained in the log-in request, and the password and the authentication name stored in the MP information table in order to judge whether the log-in request is valid.

2. A computer system comprising:

plural client computers;

one or more storage systems connected to the client computers via an IP-SAN; and a management server that controls the one or more storage systems, wherein the client computers have host bus adapters connected to the IP-SAN, wherein each storage system has:
  disk devices that stores data; and
  a storage controller that controls data write and data read in the disk devices, wherein a target constituted of one or more logical units is set in a storage area of the disk devices, wherein the storage controller has:
  plural ports connected to the P-SAN;
  plural microprocessors that control the ports;
  a first memory;
  a disk adapter connected to the disk devices; and
  a first bus that connects the microprocessors, the first memory, and the disk adapter to one another, wherein each of the microprocessors holds an MP information table that stores the number count of TCP connections that are being processed by the microprocessor, wherein the first memory holds:
  a target table that stores a name of the target set to the storage area, identifiers of the logical units constituting the target, names of the host bus adapters that are allowed to access the logical units, authentication information of the host bus adapters, and password; and
  a connection table that stores IP addresses at which the microprocessors are accessed and the TCP connection number, count obtained from each of the microprocessors, wherein the management server has a CPU, a second memory, and a network interface which are connected to one another by a second bus, wherein the network interface card is connected to the P-SAN, wherein the second memory holds:
  a storage management program executed by the CPU;
  a global target table that stores the target name, the logical unit identifiers, the host bus adapter names, and the authentication information which are obtained from the first memory of each storage system; and
  a global connection table that stores the IP addresses and the TCP connection number count which are obtained from the first memory of each storage system, and wherein the storage management program:
  refers to, upon reception of a discovery request from one of the client computers, the global connection table, and obtains an IP address of one of the microprocessors whose TCP connection number count is smaller than any other microprocessors in the storage system that contains the logical unit that is a subject of the discovery request;
  referring to the global target table, and obtains a name of one of the host bus adapters that is associated with the identifier of the logical unit that is the subject of the discovery request and with a name of the target to which this logical unit belongs, and authentication name of this host bus adapter;
  obtains the IP address of the microprocessor having the smallest TCP connection number according to the discovery request for obtaining the address of a port to be accessed;
  sends, to the microprocessor whose TCP connection number count is the smallest, the target name and the logical unit identifier that are the subject of the discovery request, and the obtained host bus adapter name, host bus adapter authentication information, and password; and
  sends the obtained IP address to access the microprocessor whose TCP connection number is the smallest to the client computer that has issued the discovery request;

wherein the microprocessor having the smallest TCP connection number stores the received target name and the logical unit identifier that are the subject of the discovery request, and the obtained host bus adapter name, host bus adapter authentication information, and password into its own MP information table;

wherein the microprocessor having the smallest TCP connection number compares, in a case where a log-in request from one of the plurality of host bus adapters is received, a password and an authentication name contained in the log-in request, and the password and the authentication name stored in the MP information table in order to judge whether the log-in request is valid.

3. A method of controlling a computer system, in which the computer system comprises:

one or more disk devices that store data;
a storage controller that controls data write and data read in the disk devices;
plural client computers connected to the storage controller via an IP-SAN,
wherein the client computers have host bus adapters connected to the IP-SAN,
wherein a target constituted of one or more logical units is set in a storage area of the disk devices,
wherein the storage controller has:
  plural ports connected to the IP-SAN;
  plural microprocessors that control the ports;
  a memory;
  a disk adapter connected to the disk devices; and
  a bus that connects the microprocessors, the memory, and the disk adapter to one another,
the method comprising holding an MP information table for each of the microprocessors, that stores the number count of TCP connections that are being processed by the microprocessor,
storing, in the memory, a target table that stores a name of the target set to the storage area, identifiers of the logical units constituting the target, names of the host bus adapters that are allowed to access the logical units, and authentication information of the host bus adapters, and password; and
storing, in the memory, a connection table that stores IP addresses at which the microprocessors are accessed and the TCP connection number count obtained from each of the microprocessors, and
having one of the microprocessors serve as a representative microprocessor which:
  inquires each of the microprocessors of the TCP connection number count;
  stores, in the connection table, the TCP connection number count sent from each of the microprocessors;
  refers to, upon reception of a discovery request from one of the client computers, the connection table, and obtains an IP address of one of the microprocessors whose TCP connection number count is the smallest;
  refers to the target table, and obtains a name of one of the host bus adapters that is associated with the identifier of the logical unit that is a subject of the discovery request and with a name of the target to which this logical unit belongs, and authentication name of this host bus adapter;
  obtains the IP address of the MP having the smallest TCP connection number according to the discovery request for obtaining the address of a port to be accessed;
  sends, to the microprocessor whose TCP connection number count is the smallest, the target name and the logical unit identifier that are the subject of the discovery request, and the obtained host bus adapter name and host bus adapter authentication information, and password; and
  sends the obtained IP address to access the microprocessor whose TCP connection is the smallest to the client computer that has issued the discovery request;
wherein the microprocessor having the smallest TCP connection number stores the received target name and the logical unit identifier that are the subject of the discovery request, and the obtained host bus adapter name, host bus adapter authentication information, and password into its own MP information table:
wherein the microprocessor having the smallest TCP connection number compares, in a case where a log-in request from one of the plurality of host bus adapters is received, a password and an authentication name contained in the log-in request, and the password and the authentication name stored in the MP information table in order to judge whether the log-in request is valid.

\* \* \* \* \*